(12) United States Patent
Ishida et al.

(10) Patent No.: US 9,470,840 B2
(45) Date of Patent: Oct. 18, 2016

(54) MULTICORE FIBER

(71) Applicant: FUJIKURA LTD., Tokyo (JP)

(72) Inventors: Itaru Ishida, Sakura (JP); Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/541,355

(22) Filed: Nov. 14, 2014

(65) Prior Publication Data

US 2015/0139597 A1    May 21, 2015

(30) Foreign Application Priority Data

Nov. 18, 2013 (JP) .................. 2013-238270

(51) Int. Cl.
*G02B 6/036* (2006.01)
*G02B 6/02* (2006.01)

(52) U.S. Cl.
CPC ............. *G02B 6/02* (2013.01); *G02B 6/02042* (2013.01); *C03B 2203/34* (2013.01)

(58) Field of Classification Search
CPC ................ G02B 6/02042; C03B 2203/34
USPC ................................................... 385/126
See application file for complete search history.

(56) References Cited

U.S. PATENT DOCUMENTS

| | | | | |
|---|---|---|---|---|
| 5,689,578 A * | 11/1997 | Yamauchi | ......... | C03B 37/01217 385/123 |
| 6,041,154 A * | 3/2000 | Ono | ........... | G02B 6/06 385/115 |
| 6,078,716 A | 6/2000 | Huang et al. | | |
| 2011/0182557 A1 | 7/2011 | Hayashi | | |
| 2011/0222828 A1 * | 9/2011 | Sasaoka | ............. | G02B 6/02042 385/127 |
| 2013/0108206 A1 * | 5/2013 | Sasaoka | ................ | G02B 6/024 385/11 |
| 2013/0136404 A1 * | 5/2013 | Feuer | ................ | G02B 6/02042 385/124 |
| 2014/0064687 A1 * | 3/2014 | Hoover | ............. | G02B 6/03644 385/126 |
| 2014/0212102 A1 * | 7/2014 | Hoover | ................. | G02B 6/024 385/126 |

FOREIGN PATENT DOCUMENTS

| | | |
|---|---|---|
| JP | 2-181708 A | 7/1990 |
| JP | 4-134402 A | 5/1992 |
| JP | 8-94864 A | 4/1996 |
| JP | 10-104443 A | 4/1998 |
| JP | 2011-170336 A | 9/2011 |

(Continued)

OTHER PUBLICATIONS

Office Action dated Aug. 4, 2015, issued in counterpart Japanese Patent Application No. 2013-238270, with English translation (9 pages).

(Continued)

*Primary Examiner* — Robert Tavlykaev
(74) *Attorney, Agent, or Firm* — Westerman, Hattori, Daniels & Adrian, LLP

(57) ABSTRACT

A multicore fiber includes a plurality of cores and a cladding surrounding the plurality of cores. The plurality of cores is arranged and disposed on a linear line passed through the center of the cladding. A pair of cores is included. The pair of the cores is located adjacent to each other, and has different core diameters in a first direction in which the plurality of cores is arranged on the linear line. A ratio of a core diameter in the first direction to a core diameter in a second direction orthogonal to the first direction is different between the pair of the cores.

2 Claims, 14 Drawing Sheets

(56) References Cited

FOREIGN PATENT DOCUMENTS

| | | |
|---|---|---|
| JP | 2013-80126 A | 5/2013 |
| JP | 2014-228705 A | 12/2014 |
| WO | 2012/064579 A1 | 5/2012 |

OTHER PUBLICATIONS

Office Action dated Mar. 1, 2016, issued in counterpart Japanese Application No. 2013-238270, with English translation (6 pages).

* cited by examiner

MULTICORE FIBER

BACKGROUND OF THE INVENTION

The present invention relates to a multicore fiber, and is preferred to the case where the crosstalk between cores is reduced.

Presently, an optical fiber for use in a popular optical fiber communication system has a structure in which a single core is surrounded by a cladding, an optical signal is propagated through the inside of the core, and information is transmitted.

In the optical fiber communication system in these years, a large number of optical fibers ranging from a few tens to a few hundreds optical fibers are used, and a volume of information transmitted is dramatically increasing. In order to reduce the number of optical fibers in such an optical fiber communication system, such a multicore fiber is proposed in which a plurality of cores is surrounded by a cladding.

For example, Patent Document 1 proposes a multicore fiber in a structure in which a plurality of cores is arranged side by side on a single linear line and these cores are entirely enclosed with a cladding.

[Patent Document 1] JP-A-10-104443

SUMMARY OF THE INVENTION

Meanwhile, in the multicore fiber described in Patent Document 1, since the distance between the center axes of cores adjacent to each other (the pitch between cores) is set to a length of 20 μm, a matter of concern is the crosstalk between the cores.

On the other hand, the outer diameter of the multicore fiber is increased in the direction in which the plurality of cores is arranged on the linear line as the distance between the center axes of the cores adjacent to each other (the pitch between the cores) is increased, and the multicore fiber is upsized.

Therefore, it is an object of the present invention to provide a multicore fiber that can reduce the crosstalk between cores while suppressing an increase in the outer diameter of the multicore fiber.

To achieve the above object, the present invention provides a multicore fiber including: a plurality of cores; and a cladding surrounding the plurality of cores, wherein the plurality of cores is arranged and disposed on a linear line passed through a center of the cladding, a pair of cores is included, the pair of the cores being located adjacent to each other and having different core diameters in a first direction in which the plurality of cores is arranged on the linear line, and a ratio of a core diameter in the first direction to a core diameter in a second direction orthogonal to the first direction is different between the pair of the cores.

In the pair in which the core diameters in the first direction are different between the cores adjacent to each other, the propagation constant is different between the cores in the first direction, so that it is possible to reduce the crosstalk between the cores, as compared with the case where the core diameters are the same in the first direction. Moreover, the ratio of the core diameter in the first direction to the core diameter in the second direction is different between the pair of the cores, so that it is possible that the core cross sectional areas are made almost the same while varying the core diameters in the first direction. Therefore, in accordance with the multicore fiber according to an aspect of the present invention, it is possible to reduce the crosstalk between the cores while maintaining the waveguide characteristics of the cores almost the same without changing the distance between the center axes of the cores adjacent to each other. Accordingly, in accordance with the multicore fiber according to an aspect of the present invention, it is possible to reduce the crosstalk between the cores while suppressing an increase in the outer diameter of the multicore fiber.

Furthermore, it is preferable that the plurality of cores includes a first core having a core diameter in the first direction greater than a core diameter in the second direction and a second core having a core diameter in the first direction equal to or less than a core diameter in the second direction, and the first core and the second core are alternately disposed.

In the case where this configuration is provided, it is possible that the core cross sectional areas are made almost the same while varying the core diameters of the cores in the first direction in all the pairs of the first core and the second core adjacent to each other. Accordingly, it is possible to further reduce the crosstalk between the cores while maintaining the waveguide characteristics of the cores almost the same without changing the distance between the center axes of the cores adjacent to each other.

Furthermore, it is preferable that the plurality of cores includes a pair of outer cores located on an outermost side and an inner core sandwiched between the outer cores, the inner core has a core diameter in the first direction greater than a core diameter in the second direction, and a ratio of a core diameter in the second direction to a core diameter of the inner core in the first direction is smaller than a ratio of a core diameter in the second direction to a core diameter of the outer core in the first direction.

Alternatively, it is preferable that the plurality of cores includes a pair of outer cores located on an outermost side and an inner core sandwiched between the outer cores, the inner core has a core diameter in the second direction greater than a core diameter in the first direction, and a ratio of a core diameter in the first direction to a core diameter of the inner core in the second direction is smaller than a ratio of a core diameter in the first direction to a core diameter of the outer core in the second direction.

In the case where this configuration is provided, it is possible that the outer shape of the inner core is in a non-circular shape, and the outer shape of the outer core in the cross section is in a shape more circular than the inner core while the core cross sectional areas of the inner core and the outer core are almost the same. Accordingly, it is possible to reduce the crosstalk between the outer core and the inner core located adjacent to the outer core while suppressing the attenuation of the outer core.

Furthermore, it is preferable that a number of the inner cores is two or greater, and a distance between center axes of the inner cores adjacent to each other is greater than a distance between center axes of the outer core and the inner core located adjacent to the outer core.

In the case where this configuration is provided, it is possible that the shape of the outer core is brought similar to the outer shape of the cladding while suppressing the crosstalk between the inner cores, as compared with the case where the distance between the center axes of the inner cores adjacent to each other is almost the same as the distance between the center axes of the outer core and the inner core located adjacent to the outer core.

As described above, according to an aspect of the present invention, there is provided a multicore fiber that can reduce the crosstalk between cores while suppressing an increase in the outer diameter of the multicore fiber.

DETAILED DESCRIPTION OF THE INVENTION

In the following, preferred embodiments for implementing the present invention will be described in detail with reference to the drawings.

1. First Embodiment

Figure 1:
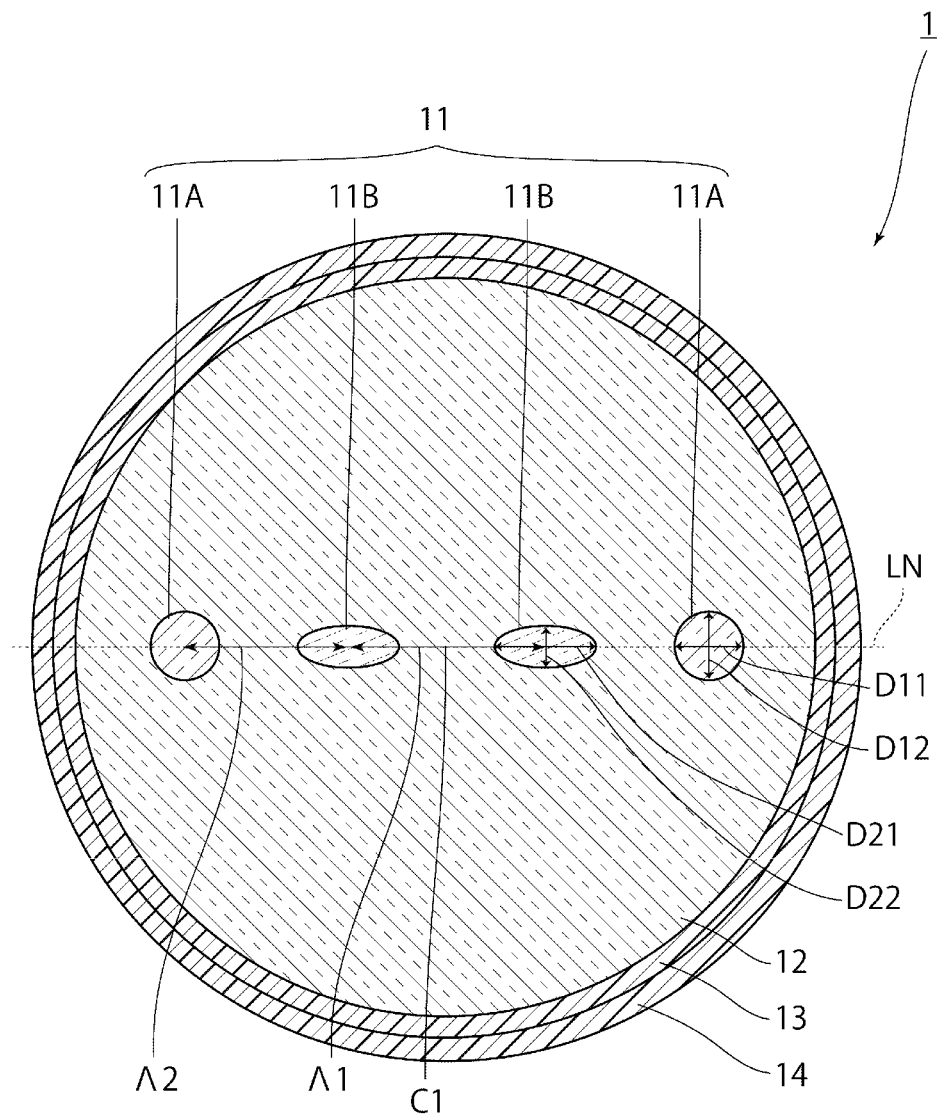
FIG. 1 is diagram of a cross section perpendicular to the longitudinal direction of a multicore fiber according to a first embodiment.

FIG. 1 is diagram of a cross section perpendicular to the longitudinal direction of a multicore fiber 1 according to a first embodiment. As illustrated in FIG. 1, the multicore fiber 1 according to the embodiment includes a plurality of cores 11, a cladding 12 that encloses the plurality of cores 11, a first protective layer 13 that encloses the cladding 12, and a second protective layer 14 that encloses the first protective layer 13 as main components.

The plurality of cores 11 is arranged and disposed on a linear line LN passed through a center C1 of the cladding 12, and includes a pair of outer cores 11A located on the outermost side and inner cores 11B sandwiched between the pair of the outer cores 11A.

In the outer core 11A, a core diameter D11 in a first direction in which the plurality of cores 11 is arranged is almost the same as a core diameter D12 in a second direction orthogonal to the first direction, and the outer shape of the core in the cross section is in a nearly circular shape. It is noted that the core diameter means the diameter of the core 11.

On the other hand, in the inner core 11B, a core diameter D21 in the first direction in which the plurality of cores 11 is arranged is greater than a core diameter D22 in the second direction orthogonal to the first direction, and the outer shape of the core in the cross section is in a nearly elliptic shape.

The core cross sectional areas of the outer core 11A and the inner core 11B are almost the same. However, the core diameters of a pair of the outer core 11A and the inner core 11B located adjacent to the outer core 11A in the first direction are different. In other words, in this pair, the core diameter D21 of the inner core 11B in the first direction is greater than the core diameter D11 of the outer core 11A in the first direction.

Moreover, the ratio of the core diameter D22 in the second direction to the core diameter D21 of the inner core 11B in the first direction is smaller than the ratio of the core diameter D12 in the second direction to the core diameter D11 of the outer core 11A in the first direction. It is noted that the ratio of the core diameter in the second direction to the core diameter in the first direction means a ratio B/A in the case where the core diameter in the first direction is defined as A and the core diameter in the second direction is defined as B.

In the case of the embodiment, two inner cores 11B are provided, and a distance Λ1 between the center axes of the inner cores adjacent to each other is greater than a distance Λ2 between the center axes of the outer core 11A and the inner core 11B located adjacent to the outer core 11A.

It is noted that in FIG. 1, the centers of the cores 11 are located on the linear line LN passed through the center C1 of the cladding 12. However, it may be fine that the centers of the cores 11 are located at positions displaced from the linear line passed through the center C1 of the cladding 12 as long as the cores 11 are arranged and disposed on the linear line LN.

Moreover, a shortest distance SD between the outer circumferential surface of the outer core 11A and the outer circumferential surface of the cladding 12 is within a length ranging between 15 μm or greater and 62.5 μm or less. More preferably, the shortest distance SD is a length ranging between 20 μm or greater and 35 μm or less.

In the multicore fiber 1 described above, in the plurality of cores 11 arranged on the linear line LN passed through the center C1 of the cladding 12, the core diameter D11 of the outer core 11A and the core diameter D21 of the inner core 11B located adjacent to the outer core 11A are different between the pair.

On this account, the propagation constant is different between the outer core 11A and the inner core 11B in the first direction, so that it is possible to reduce the crosstalk between the cores, as compared with the case where the core diameters D11 and D21 are the same in the first direction.

In addition to this, the ratio of the core diameter D12 in the second direction to the core diameter D11 of the outer core 11A in the first direction is different from the ratio of the core diameter D22 in the second direction to the core diameter D21 of the inner core 11B in the first direction. On this account, the core cross sectional area of the outer core 11A can be made almost the same as the core cross sectional area of the inner core 11B while varying the core diameters D11 and D21 in the first direction.

Therefore, in the multicore fiber 1 according to the embodiment, it is possible to reduce the crosstalk between the cores while maintaining the waveguide characteristics of the cores 11 as almost the same. Thus, in the multicore fiber 1 according to the embodiment, it is possible to reduce the crosstalk between the cores while suppressing an increase in the outer diameter of the multicore fiber 1.

Moreover, in the case of the embodiment, the inner core 11B has the core diameter D21 in the first direction greater than the core diameter D22 in the second direction, and the ratio of the core diameter D22 in the second direction to the core diameter D21 of the inner core 11B in the first direction is smaller than the ratio of the core diameter D12 in the second direction to the core diameter D11 of the outer core 11A in the first direction.

On this account, in the multicore fiber 1 according to the embodiment, it is possible that the outer shape of the inner core 11B is in a non-circular shape and the outer shape of the outer core 11A in the cross section is in a shape more circular than the inner core 11B while the core cross sectional area of the inner core 11B is almost the same as the core cross sectional area of the outer core 11A. Therefore, it is possible to reduce the crosstalk between the outer core 11A and the inner core 11B located adjacent to the outer core 11A while suppressing the attenuation of the outer core 11A.

Furthermore, in the case of the embodiment, the distance Λ1 between the center axes of the inner cores 11B adjacent to each other is greater than the distance Λ2 between the center axes of the outer core 11A and the inner core 11B located adjacent to the outer core 11A.

On this account, the shortest distance SD can be made smaller while suppressing the crosstalk between the inner cores 11B, as compared with the case where the distances Λ1 and Λ2 between the center axes are almost the same.

It is noted that in the embodiment, two inner cores 11B are provided. However, the number of the inner cores 11B may be one or may be three or greater. It is noted that in the case where two inner cores 11B or greater are provided, the distance Λ1 between the center axes of the inner cores 11B adjacent to each other may be almost the same as the distance Λ2 between the center axes of the outer core 11A and the inner core 11B located adjacent to the outer core 11A. However, in the case where the shortest distance SD is shortened while suppressing the crosstalk between the inner cores 11B, preferably, the distance Λ1 is greater than the distance Λ2 as described above.

In addition, in the embodiment, the core diameter D11 of the outer core 11A in the first direction is almost the same as the core diameter D12 in the second direction. However, it may be fine that the core diameter D11 is different from the core diameter D12 of the outer core 11A as long as the ratio of the core diameter D22 in the second direction to the core diameter D21 of the inner core 11B in the first direction is smaller than the ratio of the core diameter D12 in the second direction to the core diameter D11 of the outer core 11A in the first direction.

Figure 2:
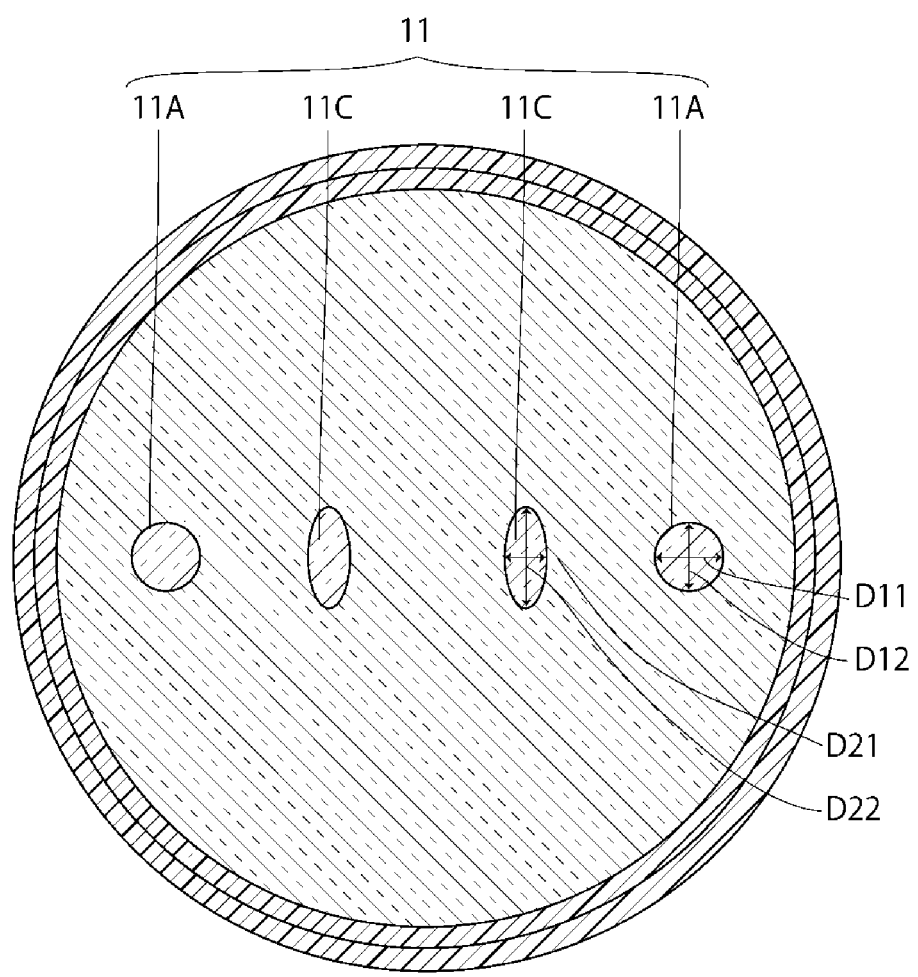
FIG. 2 is a diagram of an exemplary modification of the first embodiment illustrated on the same viewpoint as in FIG. 1.

Moreover, in the embodiment, the inner core 11B is adopted in which the core diameter D21 in the first direction is greater than the core diameter D22 in the second direction. However, it may be fine that an inner core 11C is adopted instead of the inner core 11B as illustrated in FIG. 2, in which the core diameter D22 in the second direction is greater than the core diameter D21 in the first direction. In the case where the inner core 11C is adopted, the ratio of the core diameter D21 in the first direction to the core diameter D22 of the inner core 11C in the second direction is smaller than the ratio of the core diameter D11 in the first direction to the core diameter D12 of the outer core 11A in the second direction. Even in the case where the inner core 11C is adopted, the effect similar to the effect described above can be obtained.

It is noted that although the length of the multicore fiber 1 according to the embodiment is not defined more specifically, the effect described above can be obtained even though the length of the multicore fiber 1 is a length of 1,000 m or less.

2. Second Embodiment

Next, a second embodiment will be described in detail with reference to the drawings. However, in the components of a multicore fiber according to the second embodiment, the components the same as or equivalent to the components according to the first embodiment are designated the same reference numerals and signs, and the overlapping description is appropriately omitted.

Figure 3:
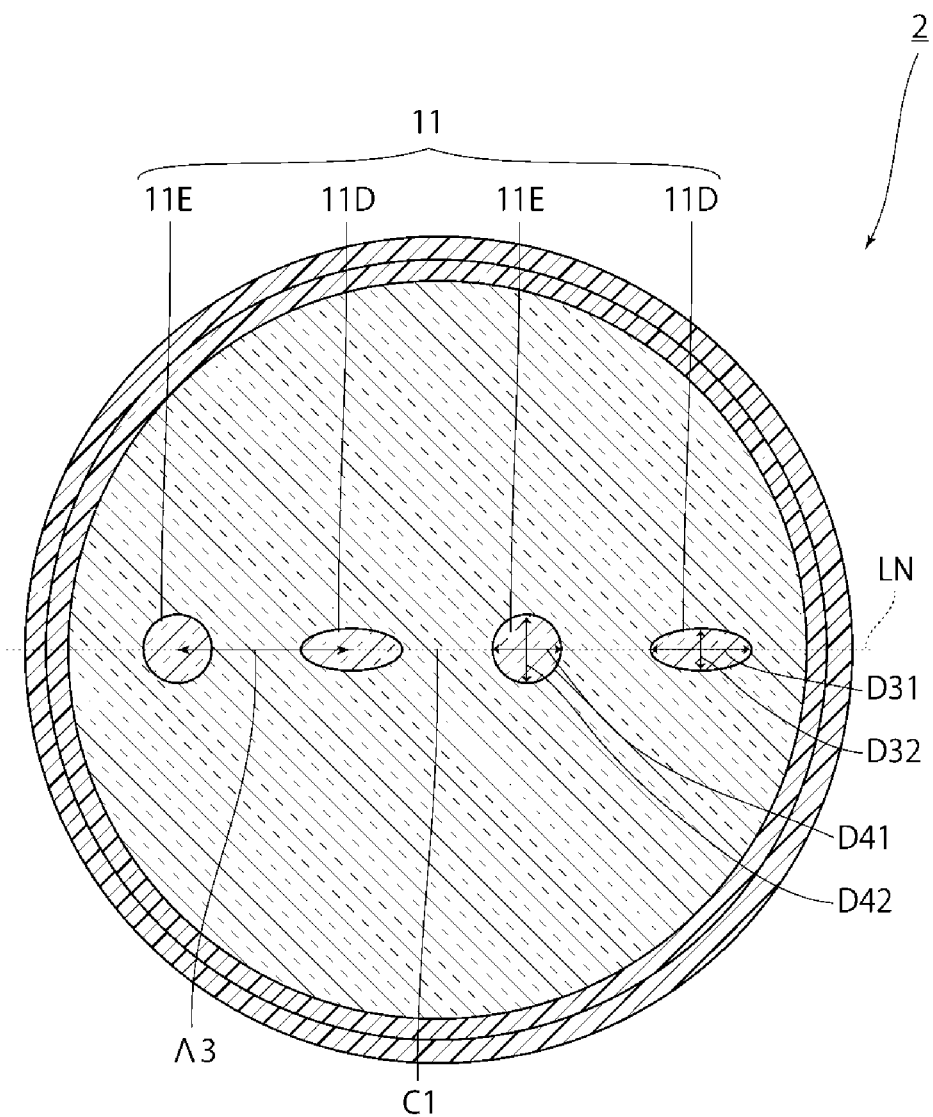
FIG. 3 is diagram of a cross section perpendicular to the longitudinal direction of a multicore fiber according to a second embodiment.

FIG. 3 is diagram of a cross section perpendicular to the longitudinal direction of a multicore fiber 2 according to the second embodiment. As illustrated in FIG. 3, in the multicore fiber 2 according to the embodiment, the configuration of a plurality of cores 11 is different from the first embodiment.

In other words, the plurality of cores 11 includes a first core 11D having a core diameter D31 in the first direction greater than a core diameter D32 in the second direction and a second core 11E having a core diameter D41 in the first direction almost the same as a core diameter D42 in the second direction.

The first core 11D corresponds to the configuration of the inner core 11B according to the first embodiment, and the second core 11E corresponds to the configuration of the outer core 11A according to the first embodiment. In other words, the outer shape of the first core 11D in the cross section is in a nearly elliptic shape, and the outer shape of the second core 11E in the cross section is in a nearly circular shape. Moreover, the core cross sectional area of the first core 11D is almost the same as the core cross sectional area of the second core 11E.

The first core 11D and the second core 11E are alternately disposed, and a distance Λ3 between the center axes of the first core 11D and the second core 11E is almost the same.

In the multicore fiber 2 described above, similarly to the multicore fiber 1, the core diameters D31 and D41 in the first direction are different between a pair of the cores 11 adjacent to each other. In addition to this, the ratio of the core diameter D32 in the second direction to the core diameter D31 of the first core 11D in the first direction is different from the ratio of the core diameter D42 in the second direction to the core diameter D41 of the second core 11E in the first direction.

Therefore, in the multicore fiber 2 according to the embodiment, similarly to the multicore fiber 1 according to the first embodiment, it is possible to reduce the crosstalk between the cores while maintaining the waveguide characteristics of the cores 11 as almost the same even though the distance Λ3 between the center axes of the adjacent cores 11 is not varied.

Moreover, in the multicore fiber 2 according to the embodiment, the plurality of cores 11 is formed as the first core 11D and the second core 11E are alternately disposed. On this account, it is possible to further reduce the crosstalk between the cores, as compared with the case where the first core 11D and the second core 11E are not alternately disposed as in the multicore fiber 1 according to the first embodiment.

It is noted that in the embodiment, two first cores 11D and two second cores 11E are provided. However, a single first core 11D and a single second core 11E may be provided, or three or more of the first cores 11D and three or more of the second cores 11E may be provided. It is noted that it may be fine that the number of the first cores 11D is different from the number of the second cores 11E as long as the first core 11D and the second core 11E are alternately disposed.

Figure 4:
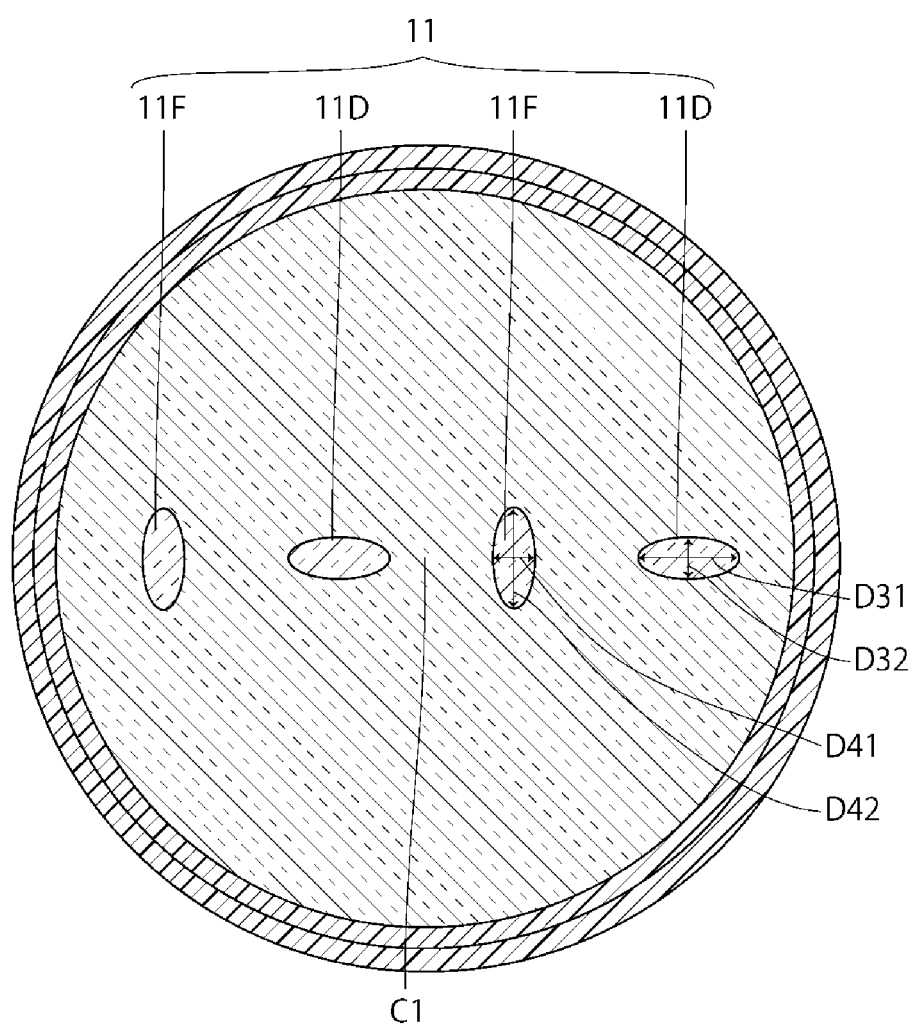
FIG. 4 is a diagram of an exemplary modification of the second embodiment illustrated on the same viewpoint as in FIG. 3.

Furthermore, in the embodiment, the second core 11E is adopted in which the core diameter D41 in the first direction is almost the same as the core diameter D42 in the second direction. However, it may be fine that a second core 11F is adopted instead of the second core 11E as illustrated in FIG. 4, in which the core diameter D41 in the first direction is smaller than the core diameter D42 in the second direction. In short, it may be fine that the plurality of cores 11 includes the first core 11D that the core diameter D31 in the first direction is greater than the core diameter D41 in the second direction, and the second core 11F that the core diameter D41 in the first direction is the core diameter D42 in the second direction or less. It is noted that in the case where the second core 11F is adopted, the crosstalk can be further reduced.

3. Method of Manufacture of a Multicore Fiber

Next, a method of manufacture of a multicore fiber will be described in detail with reference to the drawings. However, for convenience of explanation, the case will be described where the multicore fiber 1 illustrated in FIG. 1 is manufactured.

Figure 5:
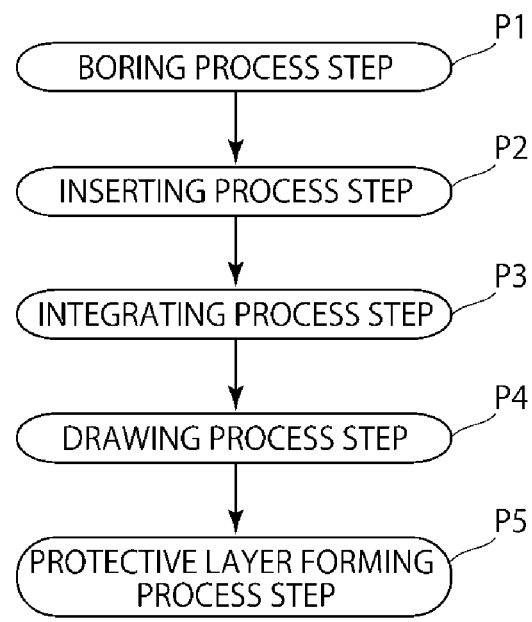
FIG. 5 is a flowchart of a method of manufacture of a multicore fiber.

FIG. 5 is a flowchart of a method of manufacture of the multicore fiber 1. As illustrated in FIG. 5, a first manufacture method includes a boring process step P1, an inserting process step P2, an integrating process step P3, a drawing process step P4, and a protective layer forming process step P5 as main process steps.

<Boring Process Step>

Figure 6:
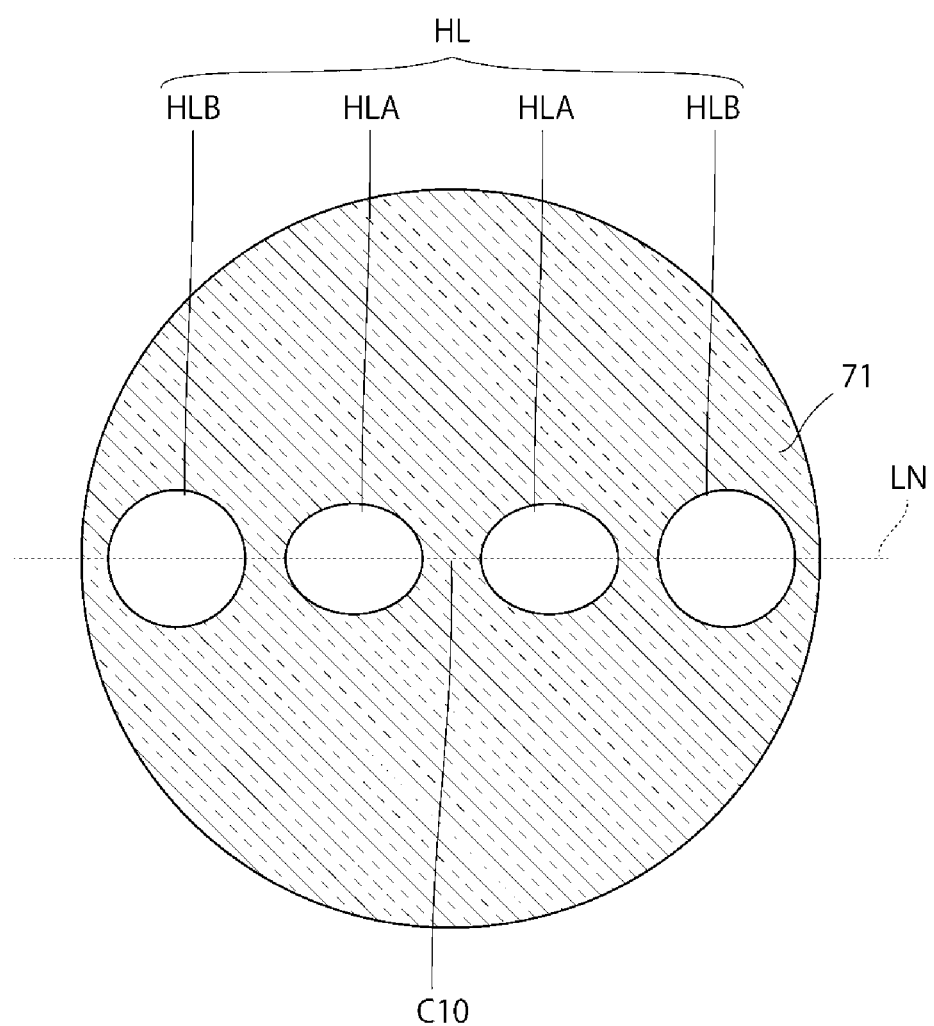
FIG. 6 is a diagram of an appearance after a boring process step.

FIG. 6 is a diagram of an appearance after the boring process step. As illustrated in FIG. 6, the boring process step P1 is the process step of boring a plurality of through holes HL in a cladding rod 71 in such a manner that the through holes HL are arranged and disposed on a linear line LN passed through a center C10 of a cladding rod along the longitudinal direction of the cladding rod 71.

More specifically, the plurality of through holes HL is bored at regular spacings, for example, along the longitudinal direction of the cladding rod 71 using a drill, for example. The cladding rod 71 is a cylindrical glass body, and is formed of pure silica, for example.

The plurality of through holes HL includes a through hole HLA in which the diameter in the second direction orthogonal to the first direction is smaller than the diameter in the first direction in which the through holes HL are arranged, and a through hole HLB in which the diameter in the first direction is almost the same as the diameter in the second direction. It is noted that the through hole HLA is formed in which a circular hole in a cross section is bored using a drill and then polished in the first direction.

The through holes HLB are a pair of the through holes HL located on the outermost side in the plurality of through holes HL, and the through holes HLA are the through holes HL on the inner side sandwiched between the pair of the through holes HLB.

It is noted that in FIG. 6, the centers of the through holes HL are located on the linear line passed through the center C10 of the cladding rod. However, it may be fine that the centers of the through holes HL are displaced from the linear line LN passed through the center C10 of the cladding rod as long as the through holes HL are arranged and disposed on the linear line passed through the center C10 of the cladding rod.

<Inserting Process Step>

Figure 7:
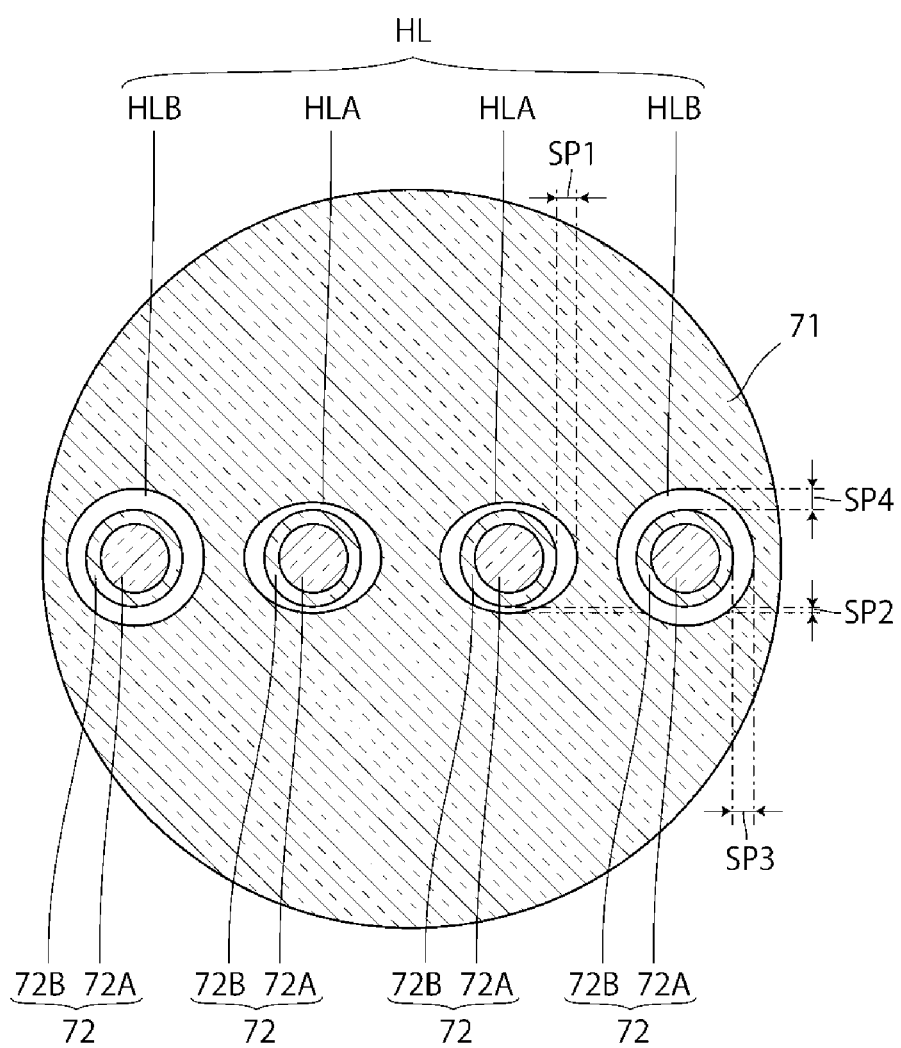
FIG. 7 is a diagram of an appearance after an inserting process step.

FIG. 7 is a diagram of an appearance after the inserting process step. As illustrated in FIG. 7, the inserting process step P2 is the process step of inserting a core enclosing rod 72 individually into the plurality of through holes HL.

The core enclosing rod 72 is a member inserted into any of the through holes HL, and has a two-layer structure in which a core rod 72A is enclosed with a glass layer 72B. The average refractive index of the core rod 72A of the core enclosing rod 72 is higher than the average refractive index of the glass layer 72B. For example, the core rod 72A is formed of silica doped with a dopant such as germanium, and the glass layer 72B is formed of pure silica. It is noted that the average refractive index of the glass layer 72B is almost the same as the average refractive index of the cladding rod 71.

Moreover, the outer shape of the core enclosing rod 72 in the cross section is in a circular shape. Therefore, in the case where the core enclosing rod 72 is inserted into the through holes HLA and HLB, a difference occurs in the spacing between the through holes HLA and HLB and the core enclosing rod 72.

In other words, a first spacing SP1 between the through hole HLA and the core enclosing rod 72 in the first direction is greater than a second spacing SP2 between the through hole HLA and the core enclosing rod 72 in the second direction.

Moreover, a third spacing SP3 between the through hole HLB and the core enclosing rod 72 in the first direction is almost the same as a fourth spacing SP4 between the through hole HLB and the core enclosing rod 72 in the second direction.

In other words, such a state is provided in which the difference between the first spacing SP1 and the second spacing SP2 is greater than the difference between the third spacing SP3 and the fourth spacing SP4.

It is noted that in FIG. 7, such a state is provided in which the center axis of the core enclosing rod 72 to be inserted into the through hole is matched with the center axis of the through hole HL. However, it may be fine that the center axis of the core enclosing rod 72 is displaced from all or a part of the center axes of the through holes HL.

<Integrating Process Step>

Figure 8:
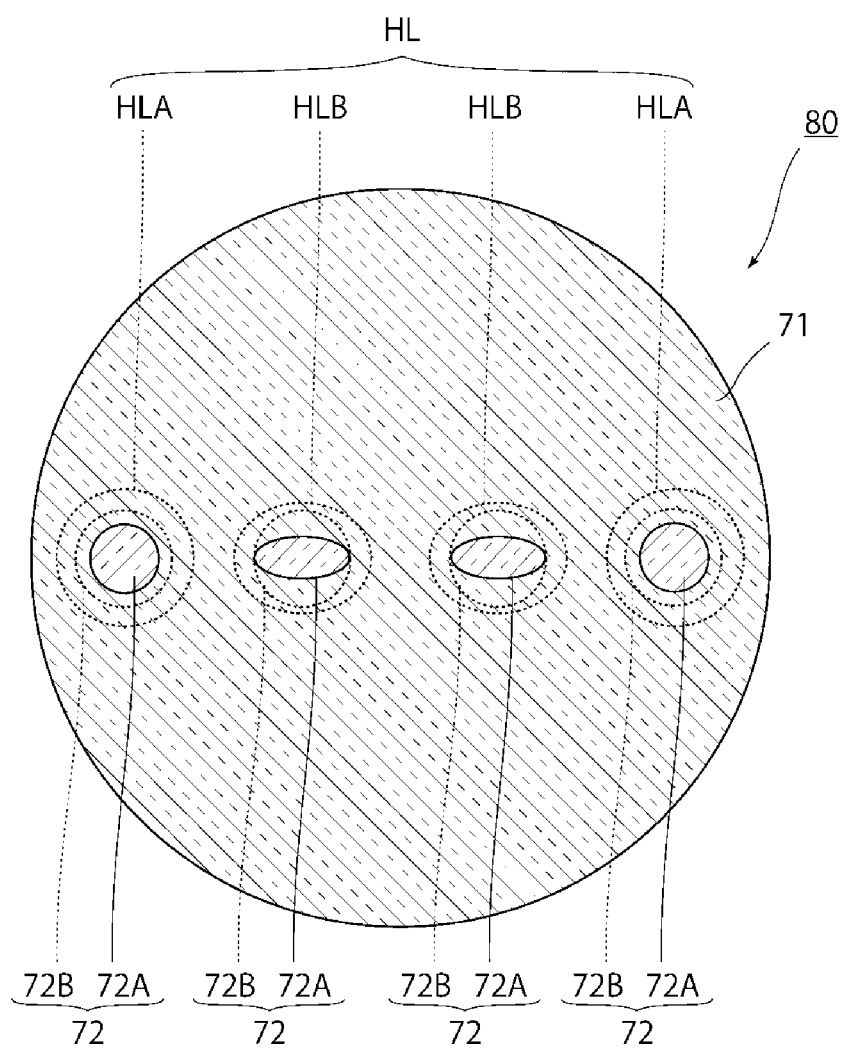
FIG. 8 is a diagram of an appearance after an integrating process step.

FIG. 8 is a diagram of an appearance after the integrating process step. As illustrated in FIG. 8, the integrating process step P3 is the process step of heating the cladding rod 71 and the core enclosing rod 72 to integrate the cladding rod 71 with the core enclosing rod 72.

More specifically, the cladding rod 71 and the core enclosing rods 72 inserted into the through holes HL of the cladding rod 71 are heated in a vacuum. In the case where the cladding rod 71 and the core enclosing rods 72 are heated, the contraction, for example, of the cladding rod 71 causes stress in the cladding rod 71 to fill the through hole HL, and the cladding rod 71 is fusion-spliced and integrated with the glass layer 72B, which is the outer layer of the core enclosing rod 72. As a result, a multicore fiber base material 80 as illustrated in FIG. 8 is obtained.

Meanwhile, in the inside of the cladding rod 71, the amount of the spacings per unit volume in the first direction in which the plurality of through holes HL is arranged is greater than the amount of the spacings per unit volume in the second direction orthogonal to the first direction. On this account, it is likely that a larger stress is applied to the through hole HL in the second direction more than in the first direction. Moreover, it is likely that a larger stress is applied to the through hole HLA on the inner side than to the through hole HLB on the outer side.

In the through hole HLA, the first spacing SP1 between the through hole HLA and the core enclosing rod 72 in the first direction is greater than the second spacing SP2 between the through hole HLA and the core enclosing rod 72 in the second direction. On this account, the amount of stress applied to the core enclosing rod 72 in the through hole HLA per unit time is much greater in the second direction than in the first direction. Therefore, the core rod 72A of the core enclosing rod 72 is deformed so as to be pressed in the second direction, whereas the core rod 72A is deformed so as to be extended in the first direction.

On the other hand, in the through hole HLB to which stress is not applied so much as compared with the through hole HLA, the third spacing SP3 between the through hole HLB and the core enclosing rod 72 in the first direction is almost the same as the fourth spacing SP4 in the second direction. On this account, the amount of stress applied to the core enclosing rod 72 in the through hole HLB per unit time is almost the same in the first direction and in the second direction. Therefore, the core rod 72A of the core enclosing rod 72 is not deformed for the most part, and the cross sectional form is maintained.

<Drawing Process Step>

The drawing process step P4 is the process step of drawing the integrated rod (the multicore fiber base material 80) in the integrating process step P3.

More specifically, an end forming process is applied as pre-processing in which one end of the multicore fiber base material 80 obtained in the integrating process step P3 is formed into a cone-shaped projection. It is noted that it may be fine that the end forming process is applied in the integrating process step P3.

The multicore fiber base material 80 is then placed on a drawing furnace, and the multicore fiber base material 80 is heated in the drawing furnace until the projection of the multicore fiber base material 80 is molten. The projection of the multicore fiber base material 80 in the molten state is drawn, and the drawn portion is cooled to an appropriate temperature using a cooling device.

As a result, the core rod 72A in the drawn portion is formed as the core 11, and the glass layer 72B and the cladding rod 71, which are fusion-spliced with each other in the portion, are formed as the cladding 12.

<Protective Layer Forming Process Step>

The protective layer forming process step P5 is the process step of forming a protective layer around the cladding 12. More specifically, the outer circumferential surface of the cladding 12 is enclosed with an ultraviolet curable resin, for example, and ultraviolet rays are applied to the ultraviolet curable resin to form the first protective layer 13.

After that, the outer circumferential surface of the first protective layer 13 is enclosed with an ultraviolet curable resin, for example, and ultraviolet rays are applied to the ultraviolet curable resin to form the second protective layer 14. Thus, the multicore fiber 1 illustrated in FIG. 1 is manufactured.

<Applications for the Other Multicore Fibers>

Figure 9:
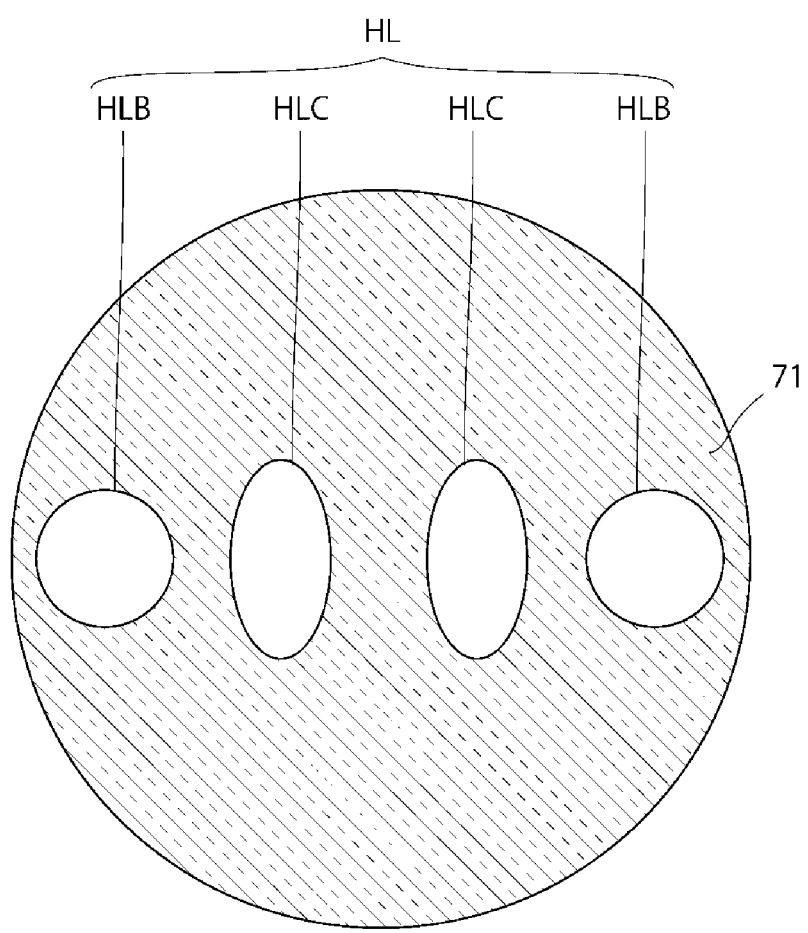
FIG. 9 is a diagram of an appearance after the boring process step in the case where the multicore fiber illustrated in FIG. 2 is manufactured.

It is noted that the manufacture method described above is the method of manufacture of the multicore fiber 1 illustrated in FIG. 1. However, in the case where the multicore fiber 2 illustrated in FIG. 2 is manufactured, the content of the boring process step P1 is changed. FIG. 9 is a diagram of an appearance after the boring process step in the case where the multicore fiber illustrated in FIG. 2 is manufactured.

As illustrated in FIG. 9, in the boring process step P1 in the case where the multicore fiber illustrated in FIG. 2 is manufactured, a through hole HLC is bored instead of the through hole HLA. In the through hole HLC, the diameter in the second direction orthogonal to the first direction is greater than the diameter in the first direction in which the through holes HL are arranged. Moreover, the diameter of the through hole HLC in the second direction is greater than the diameter of the through hole HLB in the second direction.

Thus, the amount of stress applied to the core enclosing rod 72 in the through hole HLB per unit time is smaller in the second direction than in the first direction because of the through hole HLC bored in the second direction, even though the stress applied to the through hole HLB is greater in the first direction than in the second direction when the integrating process step P3 is performed after the inserting process step P2.

Therefore, even though a different stress is applied between the through holes, the core rod 72A of the core enclosing rod 72 in the through hole HLC is deformed so as to be pressed in the first direction whereas the core rod 72A is deformed so as to be extended in the second direction.

After that, after the drawing process step P4 and the protective layer forming process step P5 are in turn applied, and then the multicore fiber illustrated in FIG. 2 is manufactured.

Figure 10:
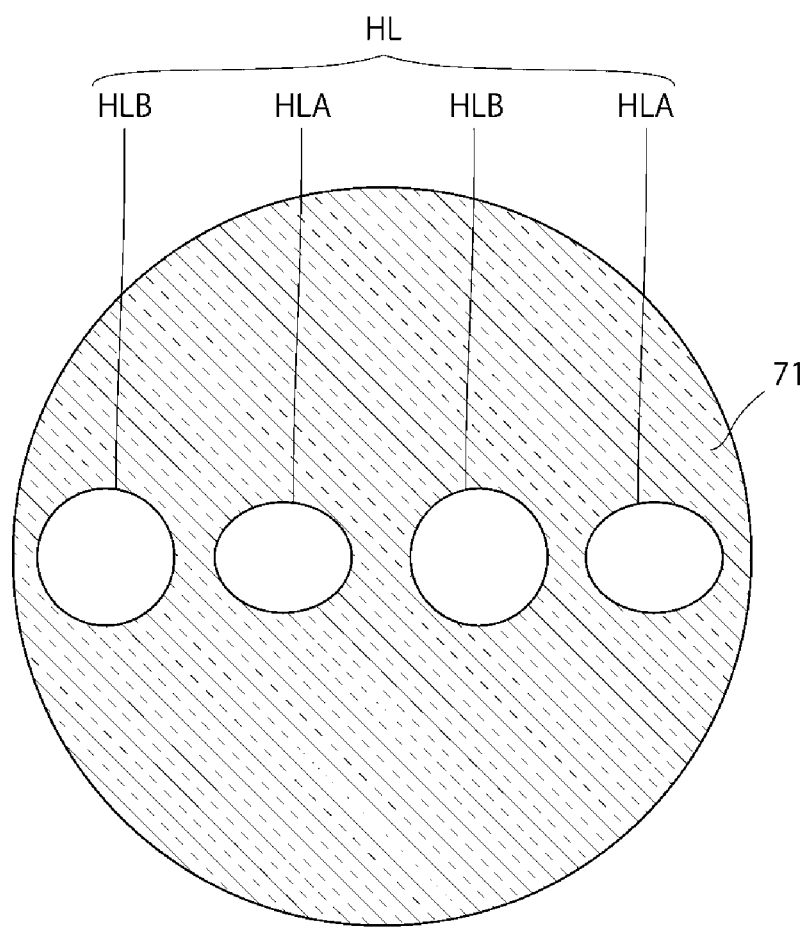
FIG. 10 is a diagram of an appearance after the boring process step in the case where the multicore fiber illustrated in FIG. 3 is manufactured.

Moreover, the content of the boring process step P1 is also changed in the case where the multicore fiber illustrated in FIG. 3 is manufactured. FIG. 10 is a diagram of an appearance after the boring process step in the case where the multicore fiber illustrated in FIG. 3 is manufactured.

As illustrated in FIG. 10, in the boring process step P1 in the case where the multicore fiber illustrated in FIG. 3 is manufactured, the through hole HLA and the through hole HLB are alternately bored. With this configuration, the inserting process step P2, the integrating process step P3, the drawing process step P4, and the protective layer forming process step P5 are in turn applied, and then the multicore fiber illustrated in FIG. 3 is manufactured. It is noted that since a larger stress is prone to be applied on the inner side than on the outer side, it is fine that the diameter of the through hole HLA on the outer side in the first direction is slightly greater than the diameter of the through hole HLA on the inner side in the first direction. Similarly, it is fine that the diameter of the through hole HLB on the outer side in the second direction is slightly smaller than the diameter of the through hole HLB on the inner side in the second direction.

Figure 11:
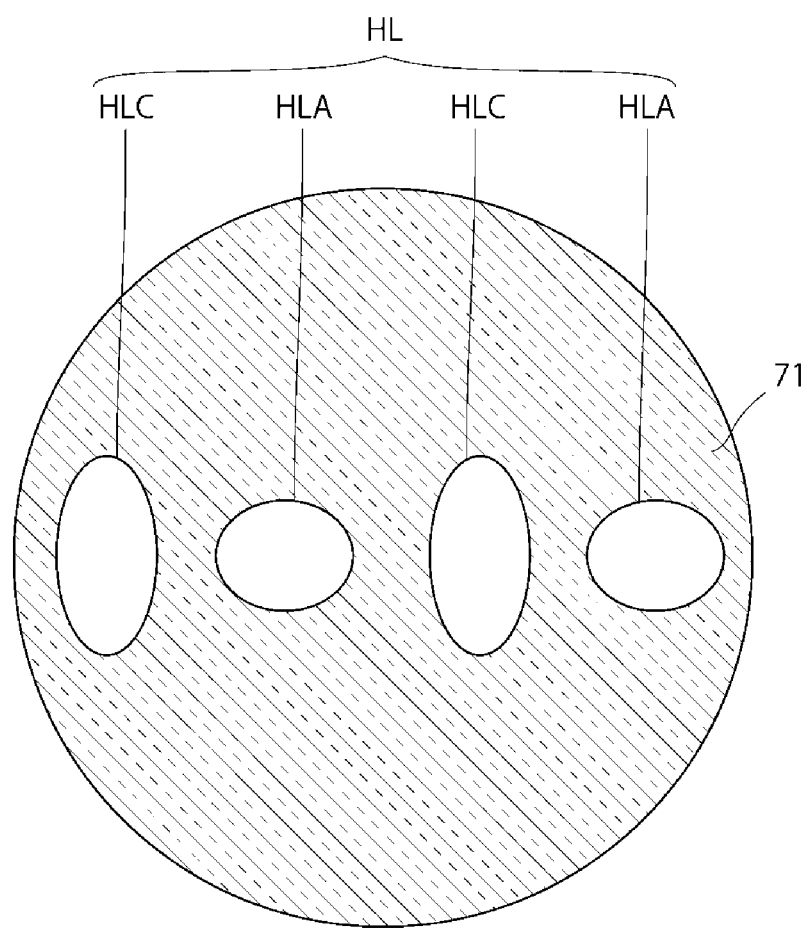
FIG. 11 is a diagram of an appearance after the boring process step in the case where the multicore fiber illustrated in FIG. 4 is manufactured.

Moreover, the content of the boring process step P1 is also changed in the case where the multicore fiber illustrated in FIG. 4 is manufactured. FIG. 11 is a diagram of an appearance after the boring process step in the case where the multicore fiber illustrated in FIG. 4 is manufactured.

As illustrated in FIG. 11, in the boring process step P1 in the case where the multicore fiber illustrated in FIG. 4 is manufactured, the through hole HLA and the through hole HLC are alternately bored. With this configuration, the inserting process step P2, the integrating process step P3, the drawing process step P4, and the protective layer forming process step P5 are in turn applied, and then the multicore fiber illustrated in FIG. 4 is manufactured. It is noted that since a larger stress is prone to be applied on the inner side than on the outer side, it is fine that the diameter of the through hole HLC on the outer side in the second direction is slightly smaller than the diameter of the through hole HLC on the inner side in the second direction. Similarly, it is fine that the diameter of the through hole HLA on the outer side in the first direction is slightly greater than the diameter of the through hole HLA on the inner side in the first direction.

<Exemplary Modifications>

In the manufacture method described above, the cross section of the core rod 72A of the core enclosing rod 72 is in a circular shape. However, it may be fine that the cross section of the core rod 72A is in an elliptic shape. More specifically, the core rod 72A is adapted in which the diameter in the direction in which the diameter is deformed to be extended is greater than the diameter in the direction orthogonal to the extending direction. The core enclosing rod 72 is inserted into the through hole HL in the state in which the major axis of the core rod 72A follows the direction in which a smaller stress is applied to the through hole HL between the first direction and the second direction. With this configuration, it is possible to further easily obtain a multicore fiber in which the cross section of the core 11 is in a non-circular shape.

Moreover, in the manufacture method described above, the cross section of the through hole HLA is in an elliptic shape, the cross section of the core enclosing rod 72 inserted into the through hole HLA is in a circular shape, and the first spacing SP1 is made greater than the second spacing SP2. However, it may be fine that the cross section of the through hole HLA is in a circular shape, the cross section of the core enclosing rod 72 inserted into the through hole HLA is in an elliptic shape, and the first spacing SP1 is made greater than the second spacing SP2.

Figure 12:
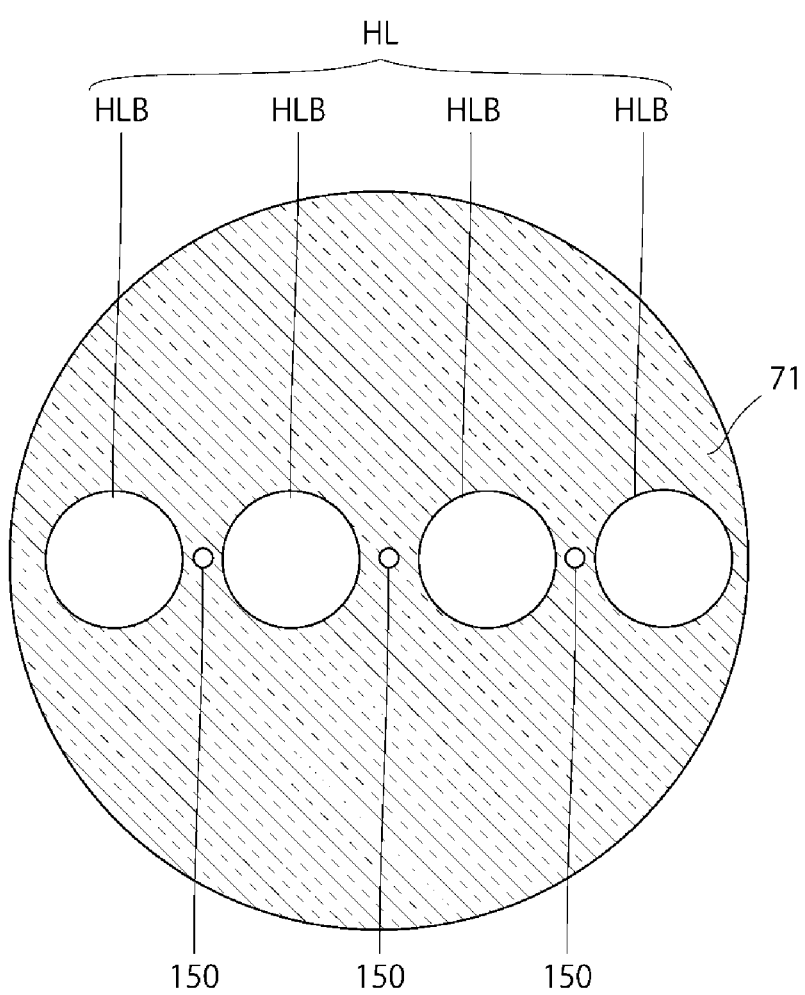
FIG. 12 is a diagram of an appearance after another boring process step.

Furthermore, in the manufacture method described above, the through hole HLA is bored in which the diameter in the second direction orthogonal to the first direction is smaller than the diameter in the first direction in which the through holes HL are arranged. However, it may be fine that as illustrated in FIG. 12, the through hole HLB is bored instead of the through hole HLA and a pair of stress buffer holes 150 filled in the integrating process step P3 is bored in the first direction in which the plurality of through holes HL is arranged as sandwiching the through hole HLB. It is noted that it may be fine that in the case illustrated in FIG. 9 or FIG. 11, the through holes HLB are bored instead of the through holes HLC and the stress buffer holes 150 are bored in the second direction as sandwiching the through hole HLA.

In addition, in the manufacture method described above, the drawing process step P4 is performed after the integrating process step P3 is performed. It may be fine that the integrating process step P3 and the drawing process step P4 are performed at the same time. In the case where the integrating process step P3 and the drawing process step P4 are performed at the same time, the end forming process is applied in which one end of the cladding rod 71 and the core enclosing rod obtained after the inserting process step P2 is formed in a cone-shaped projection. After that, the cladding rod 71 is placed on a drawing furnace, and one end of the cladding rod 71 and the core enclosing rod is drawn as integrally formed in the drawing furnace.

It is noted that the multicore fiber and the method of manufacture of the multicore fiber according to the present invention can be appropriately combined, omitted, modified, and added with publicly known techniques, for example, without deviating from the object of the present application, other than the content described above.

Examples

Figure 13:
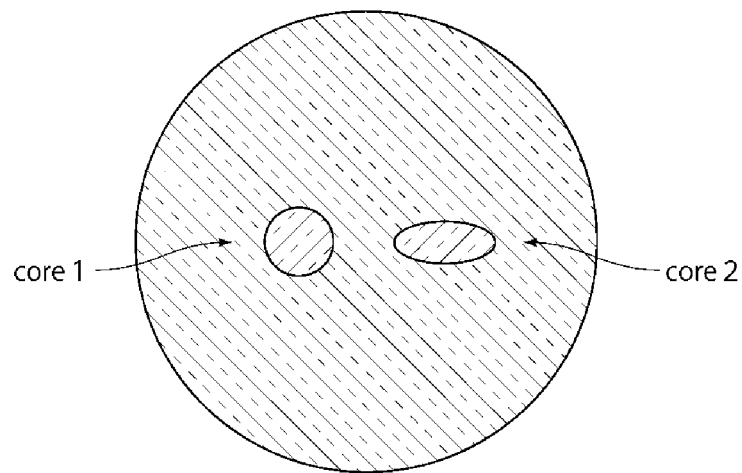
FIG. 13 is diagram of a cross section perpendicular to the longitudinal direction of a multicore fiber according to a first example.
Figure 14:
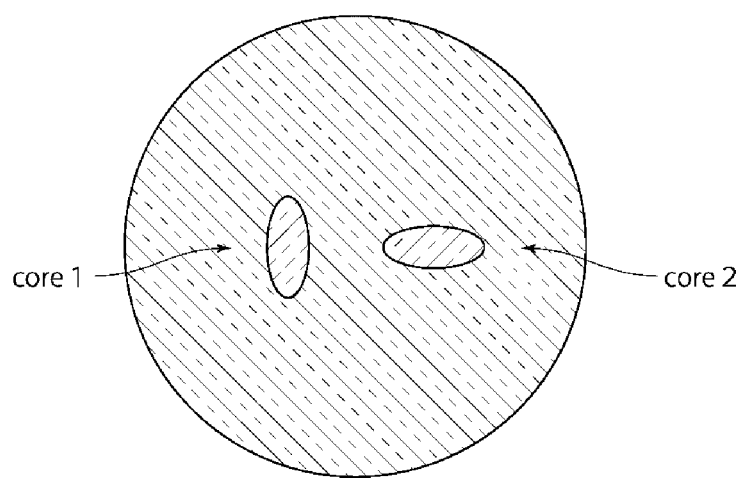
FIG. 14 is diagram of a cross section perpendicular to the longitudinal direction of a multicore fiber according to a second example.
Figure 15:
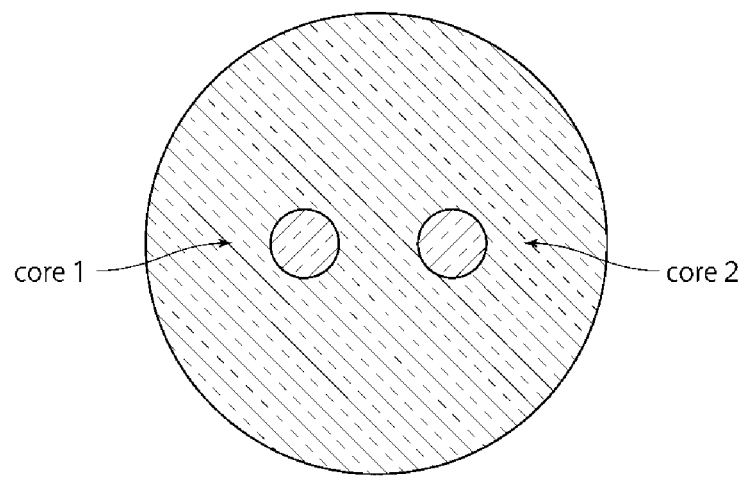
FIG. 15 is diagram of a cross section perpendicular to the longitudinal direction of a multicore fiber according to a first comparative example.
Figure 16:
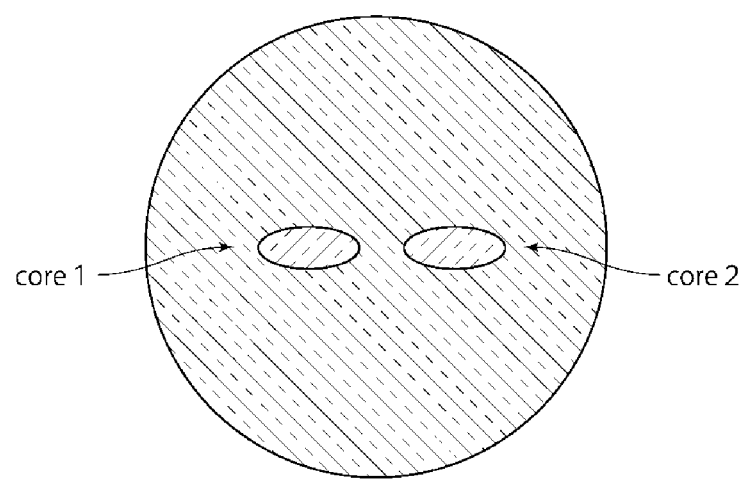
FIG. 16 is diagram of a cross section perpendicular to the longitudinal direction of a multicore fiber according to a second comparative example.

A multicore fiber illustrated in FIG. 13 was experimentally produced for a first example, a multicore fiber illustrated in FIG. 14 was experimentally produced for a second example, a multicore fiber illustrated in FIG. 15 was experimentally produced for a first comparative example, and a multicore fiber illustrated in FIG. 16 was experimentally produced for a second comparative example.

These multicore fibers were designed in which the multicore fibers were operated in the single mode at a wavelength of 1,550 nm. The mode field diameter at a wavelength of 1,550 nm is a diameter of about 6.6 µm in all the cores of the multicore fibers.

The distance between the center axes of the cores of the multicore fibers was set to a length of 27 µm, and the relationship between the non-circularity and the crosstalk between the cores in the core cross section was investigated. The result of the investigation is shown in Table 1 below. It is noted that the non-circularity means that the difference between the diameter in the first direction and the diameter in the second direction is divided by the mean value of the diameter in the first direction and the diameter in the second direction and the quotient is multiplied by 100.

TABLE 1

|  | Non-Circularity (%) | | Crosstalk between |
| --- | --- | --- | --- |
|  | Core 1 | Core 2 | Cores |
| First Example | 0 | 7 | −33 dB |
|  | 0 | 10 | −36 dB |
| Second Example | 2 | 8 | −36 dB |
|  | 3 | 11 | −40 dB |
| First Comparative Example | 0 | 0 | −24 dB |
| Second Comparative Example | 10 | 10 | −23 dB |

From the comparison of the first and second examples with the first and second comparative examples shown in Table 1, it was revealed that in the case where the core diameters of the cores adjacent to each other are different in the first direction in which the cores are arranged and the ratio of the core diameters in the first direction is different from the ratio of the core diameters in the second direction orthogonal to the first direction in these cores, the crosstalk between the cores can be reduced.

Moreover, a multicore fiber in the same structure as the structure of the multicore fiber 1 illustrated in FIG. 1 was experimentally produced in such a manner that the multicore fiber was operated in the single mode at a wavelength of 1,550 nm. The mode field diameter at a wavelength of 1,550 nm is a diameter of about 6.6 µm in all the cores of the multicore fibers.

In the multicore fiber, the distance between the center axes of the outer core and the inner core located adjacent to the outer core was set to a length of 27 µm, the distance between the center axes of the inner cores adjacent to each other was set to a length of 31 µm, the cladding diameter was set to a diameter of 125 µm, the non-circularity of the outer core was set to 0%, and the non-circularity of the inner core was set to 6%.

In the multicore fiber, the crosstalk between the cores adjacent to each other was all 25 dB or less, and was excellent more than in the first and second comparative examples.

The invention claimed is:

1. A multicore fiber comprising:
a plurality of cores; and
a cladding surrounding the plurality of cores, wherein
the plurality of cores are arranged on a linear line passing through a center of the cladding, the plurality of cores disposed in a symmetrical pattern with respect to the center of the cladding,
the plurality of cores includes a pair of outer cores each located on an outermost side of the plurality of cores,
the plurality of cores includes at least one pair of inner cores adjacent to each other and sandwiched between the pair of outer cores,
the plurality of cores includes a pair of cores located adjacent to each other and having different core diameters in a first direction in which the plurality of cores is arranged on the linear line, a ratio of a core diameter in the first direction to a core diameter in a second direction orthogonal to the first direction being different between the cores of the core pair,
each inner core has a core diameter in the first direction greater than a core diameter in the second direction,
a ratio of a core diameter in the second direction to a core diameter in the first direction for each outer core is closer to 1 than a ratio of a core diameter in the second direction to a core diameter in the first direction for each inner core such that an outer shape of each outer core in a cross section is closer to being circular than an outer shape of each inner core, and
a distance between center axes of the adjacent inner cores is greater than a distance between center axes of one outer core of the outer core pair and one inner core of the inner core pair that is located adjacent to the one outer core of the outer core pair.

2. A multicore fiber comprising:
a plurality of cores; and
a cladding surrounding the plurality of cores, wherein
the plurality of cores are arranged on a linear line passing through a center of the cladding, the plurality of cores disposed in a symmetrical pattern with respect to the center of the cladding,
the plurality of cores includes a pair of outer cores each located on an outermost side of the plurality of cores,
the plurality of cores includes at least one pair of inner cores adjacent to each other and sandwiched between the pair of outer cores,
the plurality of cores includes a pair of cores located adjacent to each other and having different core diameters in a first direction in which the plurality of cores is arranged on the linear line, a ratio of a core diameter in the first direction to a core diameter in a second direction orthogonal to the first direction being different between the cores of the core pair,
each inner core has a core diameter in the second direction greater than a core diameter in the first direction,
a ratio of a core diameter in the second direction to a core diameter in the first direction for each outer core is closer to 1 than a ratio of a core diameter in the second direction to a core diameter in the first direction for each inner core such that an outer shape of each outer core in a cross section is closer to being circular than an outer shape of each inner core, and
a distance between center axes of the adjacent inner cores is greater than a distance between center axes of one outer core of the outer core pair and one inner core of the inner core pair that is located adjacent to the one outer core of the outer core pair.

\* \* \* \* \*